(12) United States Patent
Tremblay et al.

(10) Patent No.: US 11,977,557 B2
(45) Date of Patent: May 7, 2024

(54) EXTENSIBLE DATA PIPELINE MANAGER

(71) Applicant: NCR Voyix Corporation, Atlanta, GA (US)

(72) Inventors: Joseph Laval Tremblay, College Station, TX (US); Jack Eugene Edwards, Jr., Cypress, TX (US); Venkata Siva Krishna Gudivada, College Station, TX (US); Brett Jamison Wolfe, College Station, TX (US)

(73) Assignee: NCR Voyix Corporation, Atlanta, GA (US)

( * ) Notice: Subject to any disclaimer, the term of this patent is extended or adjusted under 35 U.S.C. 154(b) by 864 days.

(21) Appl. No.: 16/696,900

(22) Filed: Nov. 26, 2019

(65) Prior Publication Data

US 2021/0157605 A1 May 27, 2021

(51) Int. Cl.
*G06F 16/25* (2019.01)
*G06F 11/07* (2006.01)

(52) U.S. Cl.
CPC ........ *G06F 16/254* (2019.01); *G06F 11/0772* (2013.01); *G06F 16/258* (2019.01)

(58) Field of Classification Search
None
See application file for complete search history.

(56) References Cited

U.S. PATENT DOCUMENTS

| 2005/0187991 | A1* | 8/2005 | Wilms | G06F 16/254 |
| 2019/0163769 | A1* | 5/2019 | Hachem | G06Q 20/202 |
| 2020/0210427 | A1* | 7/2020 | Dugan | G06F 16/219 |

* cited by examiner

*Primary Examiner* — Amresh Singh
(74) *Attorney, Agent, or Firm* — Schwegman Lundberg & Woessner, P.A.

(57) ABSTRACT

Disclosed is an extensible data pipeline. The extensible data pipeline can include detecting, by a backend system, incoming data at a spigot. The backend system can initiate a sequence of transforms upon detecting the incoming data. Each of the transforms can be operative to perform an operation on the data and output both transformed data and a status identifier. The status identifier can indicate a status of a transform operation for a respective one of the transforms. The transformed data from a final transform can be stored along with a final identifier indicating a status of the final transform.

17 Claims, 3 Drawing Sheets

EXTENSIBLE DATA PIPELINE MANAGER

SUMMARY

Disclosed is an extensible data pipeline. The extensible data pipeline can include detecting, by a backend system, incoming data at a spigot. The backend system can initiate a sequence of transforms upon detecting the incoming data. Each of the transforms can be operative to perform an operation on the data and output both transformed data and a status identifier. The status identifier can indicate a status of a transform operation for a respective one of the transforms. The transformed data from a final transform can be stored along with a final identifier indicating a status of the final transform.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

Corresponding reference characters indicate corresponding parts throughout the several views. The exemplifications set out herein illustrate exemplary embodiments of the disclosure, and such exemplifications are not to be construed as limiting the scope of the disclosure any manner.

DETAILED DESCRIPTION

Figure 1:
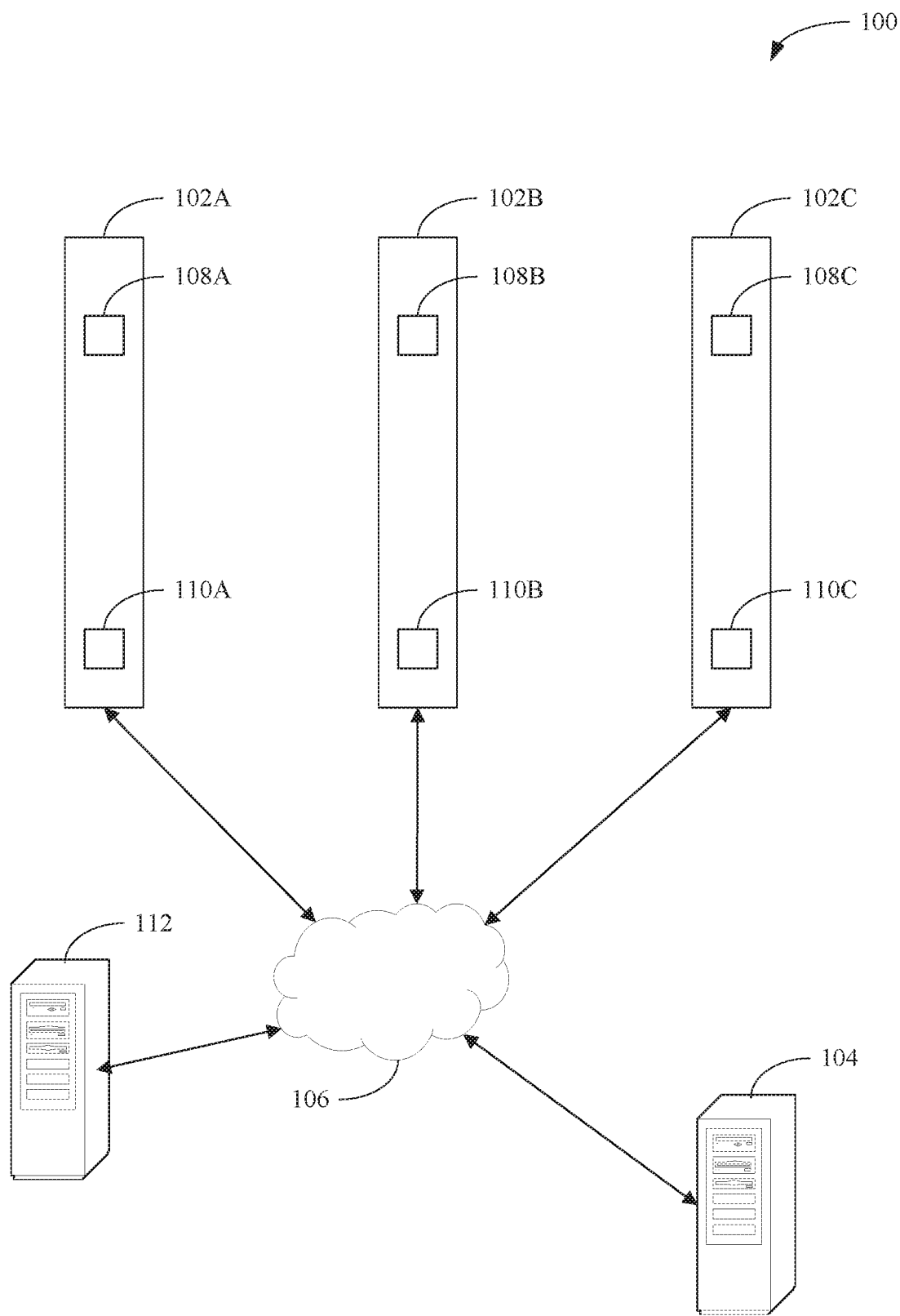
FIG. 1 shows an example schematic of a system consistent with this disclosure.

As disclosed herein, a software system can receive data and react to it. For example, a file can be received, parsed, and stored in a database. The extensible data pipeline manager disclosed herein provides a standard way to define pipelines to accept and process data. Using the systems and methods disclosed herein allows for core functionality that is built-in to a software system to be defined. In addition, ad hoc pipelines can be created with a sequence of steps executing core functionality and custom plugins. In other words, user needs can be responded to quickly without changes to core software products.

The systems and methods disclosed herein can allow user to create and manage content for all the locations in an enterprise. As disclosed herein, a menu definition can be data bound to arrange text, images, and videos. In other words, one menu definition can display differently based on the data for each location.

As disclosed herein, a backend service can be used to process data that is provided by external systems. For example, customers can regularly transfer thousands of files to a central system via SFTP. By transferring the files, the central system has access to the latest point of sale (POS) items and prices for each store. The systems and methods disclosed herein can use "data source" plugin modules, which may or may not be specific to a file schema, to import the data so that the data can be used by other systems and/or modules of a system, such as a digital menu hoard content definition.

One situation that can cause problems is when a user wants to do something atypical with the data provided to the central system. One solution is to extend data source plugin modules to handle the functionality. However, adding code for specific use cases requires more regression testing and increases risk of adversely affect other users of the system. Another solution is to create plugin modules specifically for the user and/or use case. Creating additional plugin modules can mean maintaining additional code bases, which can require enhancement, correction, and testing, which can result in multiplied deployment difficulties.

As disclosed herein, an extensible data pipeline manager (EDPM) can be utilized to run ad hoc data pipelines. The EDPM can be added to backend services, such as Vitalcast distributed by NCR Corporation of Atlanta, GA, and used to ingest data. The EDPM can also include functionality to handle common use cases as disclosed herein.

As disclosed herein, a data pipeline can consist of one inlet followed by a sequence of transforms. The inlet, sometimes called a spigot, can detect when new data is available. The spigot can be a function that runs continuously while the EDPM is enabled. When the spigot detects new data, the spigot can initiate the sequence of transforms.

As disclosed herein, a transform can handle a step in the sequence. There can be any number of transforms in the EDPM. Each transform can be a function. Each transform can accept an input value. Each transform can read the output or cached values of any prior transform in the sequence. Each transform can write values to the cache for access by subsequent transforms. Each transform can output a status, such as "success," "fail," "stop", etc., and a value.

The sequence can begin by running a first transform, which is provided new data as input. If a transform outputs a "fail" or "stop" the sequence can end immediately. If the transform outputs "success" and there is another transform in the sequence, then the next transform can be run with the previous output value. At the end of the sequence the spigot can receive the final status and value(s).

As disclosed herein the EDPM can include functionality needed for pipelines, such as new file detection, data pattern matching, data caching, file copying, and file deletion. The EDPM can also support custom plugins Custom plugins can allow the EDPM to handle specific operations and can be executed within a pipeline as a built-in function. Thus, a pipeline can be composed of standard built-in steps as well as plugins. The use of a plugin can be because there are no built-in functions to do what was needed. Thus, using the EDPM can allow for the calling of external functions defined in a plugin in a pipeline as the spigot or as a transform. Using a plugin can not only allow doing something different with data, but it can also mean the source and destination for data is unlimited. For example, plugins can be created to read data from TWITTER® or write data to table storage, such as AZURE® table storage.

The EDPM disclosed herein can add additional built-in functionality. For example, Vitalcast is a digital signage system put out by NCR Corporation of Atlanta, Georgia In a Vitalcast use case, a check can be performed to determine whether a particular store is configured for a customer's data source. As disclosed herein, added functionality can be accomplished by components of the EDPM with both built-in and plugin transforms.

The EDPM disclosed herein can have a configuration API to define the data pipelines. The systems disclosed herein that use the EDPM disclosed herein can provide the layer for configuration. For example, the EDPM disclosed herein can provide configuration via REST or reading a JSON file.

Turning now to the figures, FIG. 1 shows a system 100 consistent with this disclosure. System 100 can include first location 102A, second location 102B, third location 102C (collectively locations 102) and a backend system 104. Backend system 104 can be electrically coupled to locations 102 via a network 106. Locations 102 can include point of sale (POS) terminals 108 (labeled individually as first POS terminal 108A, second POS terminal 108B, and third POS terminal 108C) and displays 110 (labeled individually as first display 110A, second display 110B, and third display 110C). While FIG. 1 shows each of locations 102 having a single POS terminal and a single display, each of locations 102 can have any number of POS terminals and displays. The POS terminals 108 and the displays 110 can be located through locations 102.

Backend system 104 can also be connected to an external data source 112. External data source 112 can be information systems that are not controlled by the owner of backend system 104. For example, external data source 112 can be social media sources, databases maintained by product vendors, etc. While FIG. 1 shows system 100 having a single external data source 112, backend system 104 can access any number of external data sources.

As disclosed herein, backend system 104 can operate as an EDPM. For example, POS data from each of POS terminals 108 can be received by backend system 104 via network 106. In addition, non-POS data can be received by backend system 104 from external data source 112. For example, user reviews, competitor pricing, manufacturer specifications can be received from external data sources. For instance, user reviews can be obtained from social media websites such as TWITTER® or online retailers, such as AMAZON®. Competitor pricing can be obtained from competitor's websites and manufacturer specifications can be obtained from databases or websites maintained by manufacturers and/or online retailers.

The data from the POS terminals 108 and external data source 112 can be in different formats. For example, the POS terminals 108 can each use different versions of POS software and/or different POS software. The different versions and/or software packages may save data in different formats. External data source 112 can also save data in a variety of formats.

As disclosed herein, backend system can concatenate data from POS terminals 108 and/or external data source 112 and display the concatenated data on displays 110. Since the data may be in different formats, the EDPM disclosed herein can transform the data into a common format using by backend system 104 and displayable by displays 110.

The EDPM can detect incoming data and/or the presence of new data. Once the incoming and/or new data is detected the EDPM can initiate a series of transforms. The series of transforms can include a number of individual transforms. Each of the individual transforms can perform a single operation, or transform, on the data, or portions of the data. The individual transforms can take inputted data and return outputted, or transformed data, and a status identifier.

The status identifier can indicate a status of the transform. For example, the status identifier can be "success," "stop," or "fail." A status identifier of "success" can indicate that the transform completed successfully with no errors. A status identifier of "fail" can indicate the transform completed, but the data was not successfully transformed. A status identifier of "stop" can indicate the transform stopped, but no error was detected.

As each transform is completed, the transformed data and the status identifier can be saved to a memory or saved in a cache. For example, as each transform completes, the status identifier and the status identifier can be saved in a cache for later use by another transform. Once the series of transforms is completed, the transformed data and status identifier(s) can be saved in a memory and deleted from the cache. In other words, the cache can maintained for a single run through a sequence of transforms.

Once the input data is transformed, the transformed data can be transmitted to displays 110 for display in addition to transmitting the transformed data to displays 110, the transformed data can be transmitted to servers or other remote computers for analysis and/or storage.

Figure 2:
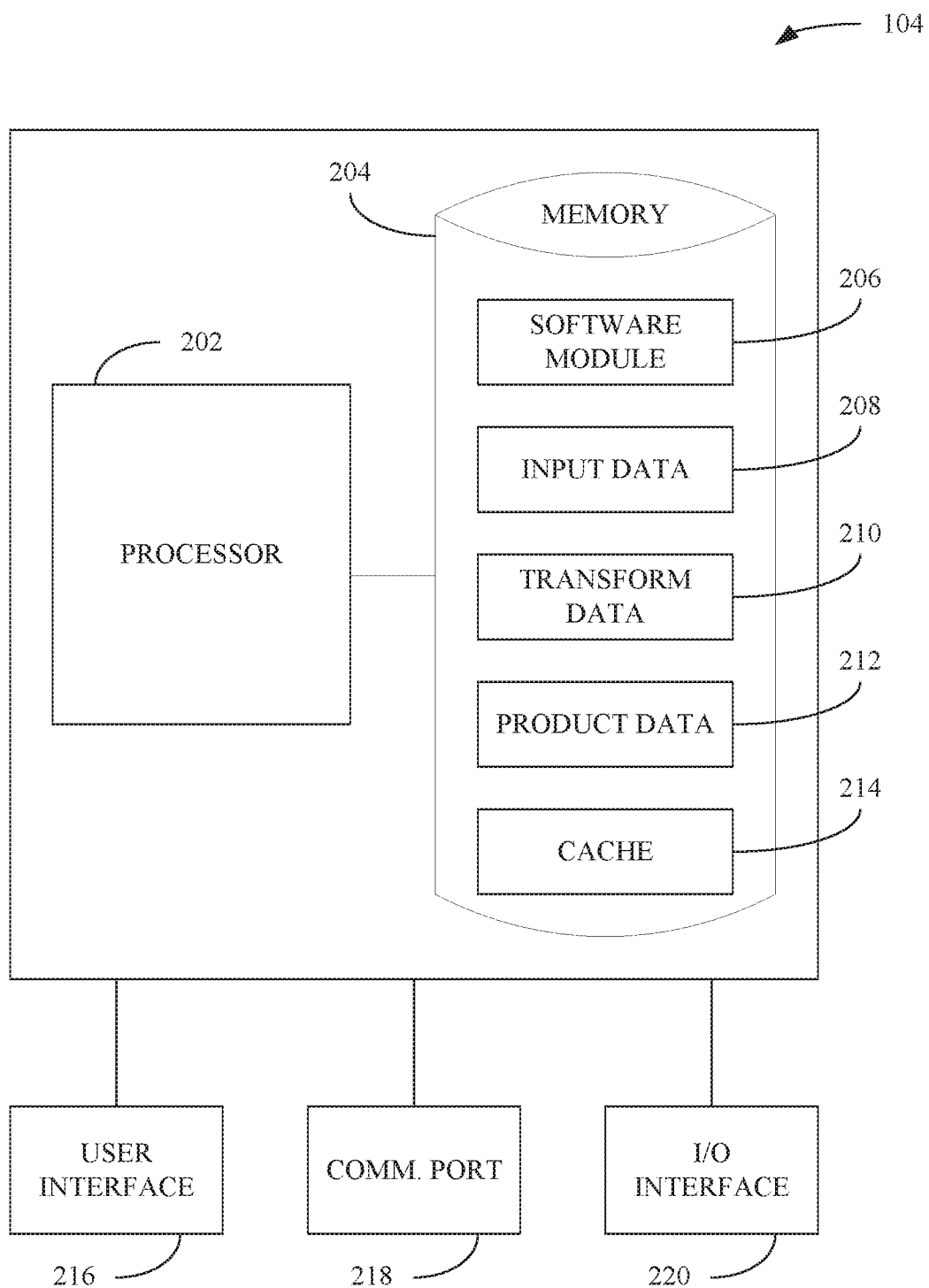
FIG. 2 shows an example schematic of a backend system consistent with this disclosure.

FIG. 2 shows an example schematic of backend system 104. As shown in FIG. 2, backend system 104 can include a processor 202 and a memory 204. Memory 204 can include a software module 206, input data 208, transform data, product data, and a cache. While executing on processor 202, software module 206 can perform processes for managing an extensible data pipeline, including, for example, one or more stages included in a method 300 described below with respect to FIG. 3. Backend system 104 can also include a user interface 216, a communications port 218, and an input/output (I/O) device 220.

Non-limiting examples of input data 208 can include POS data, product data, images of products, etc. For example, input data 208 can include POS data such as pricing information, number of products sold, average number of products sold in a given time frame, time of day products are sold, or any data that a POS terminal can collect.

Transform data 210 can include functions that can be executed by software module 206 to transform data. For example, transform data 210 can include a transform that reads in data and transforms the data according to one or more business rules. Non-limiting examples of transforms can include, checking to see if a "Store ID" is configured for the system, changing the format of the data from XML to JSON, removing irrelevant data (e.g., removing all condiments from menu data), adding additional data (e.g., adding a calorie value for each menu item), validating menu data (e.g., if a POS file contains items that are not in an "approved items" list then send a message to the main office).

As another example, a transform can include extract, transform, load (ETL), which can allow data to be collected from various sources, transform the data according to business rules, and load it into a destination data store. Reduce, also known as Aggregate or Fold, can be a transform that allows for applying the same function to each element of a data sequence so that a result is accumulated.

ETL can be achieved by a series of transforms, not a single "ETL" transform. For example, an ETL can include: Spigot receives a file; Extract: transform extracts info from the file; Extract: transform retrieves related data from a web service; Transform: transform combines all pertinent data into a new format; and Load: transform stores the transformed data (e.g., to a file system, database, or posted to another API).

An example of a ETL operation can include a spigot receiving a POS file. The extract operations can include Extract: transform parses POS file and produces a list of all item IDs and Extract: transform looks up (from a database) caloric values for each item ID and produces an item-calorie map. The transform operation can include Transform: transform produces a new data format with all relevant POS data plus the calorie values. The load operation can include Load: transform ingests the new data format into another data store.

Another example of an ETL operation can include a spigot receives a customer ID. The extract operations can include Extract: transform looks up the customer's order history and Extract: transform looks up customer's profile for dietary restrictions. The transform operation can include Transform: transform uses this information in an algorithm to determine recommendations. The load operation can include Load: transform sends these personalized recommendations to another system, which may or may not provide the personalized recommendations to the customer.

Another example of a transform can include concatenating data. For example, product data 212 can be concatenated with transform data 210 to create concatenated data that can then be saved as transform data.

Product data 212 can include information about products that can correspond to products sold via POS terminals 108. Product data 212 can include data from remote sources. For example, product data 212 can include user reviews, data from social media websites, data from product manufactures, etc.

Transform data 210 can also include data that has been transformed. For example, after a sequence of transforms has been completed, the transformed data can be saved as transform data 210.

Cache 214 can include data that is temporarily stored. For example, as a sequence of transforms is being processed, data and status indicators can be temporarily stored in cache 214. During the sequence of transforms, the data and status indicators can be retrieved as needed from cache 214 until the sequence of transforms completes. Upon completion of the sequence of transforms, cache 214 can be cleared.

User interface 216 can include any number of devices that allow a user to interface with backend system 104. Non-limiting examples of user interface 216 can include a keypad, a microphone, a display (touchscreen or otherwise), etc.

Communications port 218 can allow backend system 104 to communicate with various information sources and devices, such as, but not limited to, POS terminals 108, displays 110, and external data sources 112, mobile devices such as a user's smart phone, peripheral devices, etc. Non-limiting examples of communications port 218 can include, Ethernet cards (wireless or wired), Bluetooth® transmitters and receivers, near-field communications modules, etc.

I/O device 220 can allow backend system 104 to receive and output information. Non-limiting examples of I/O device 220 can include, a camera (still or video), scales, optical or barcode scanners, fingerprint or other biometric scanners, etc.

Figure 3:
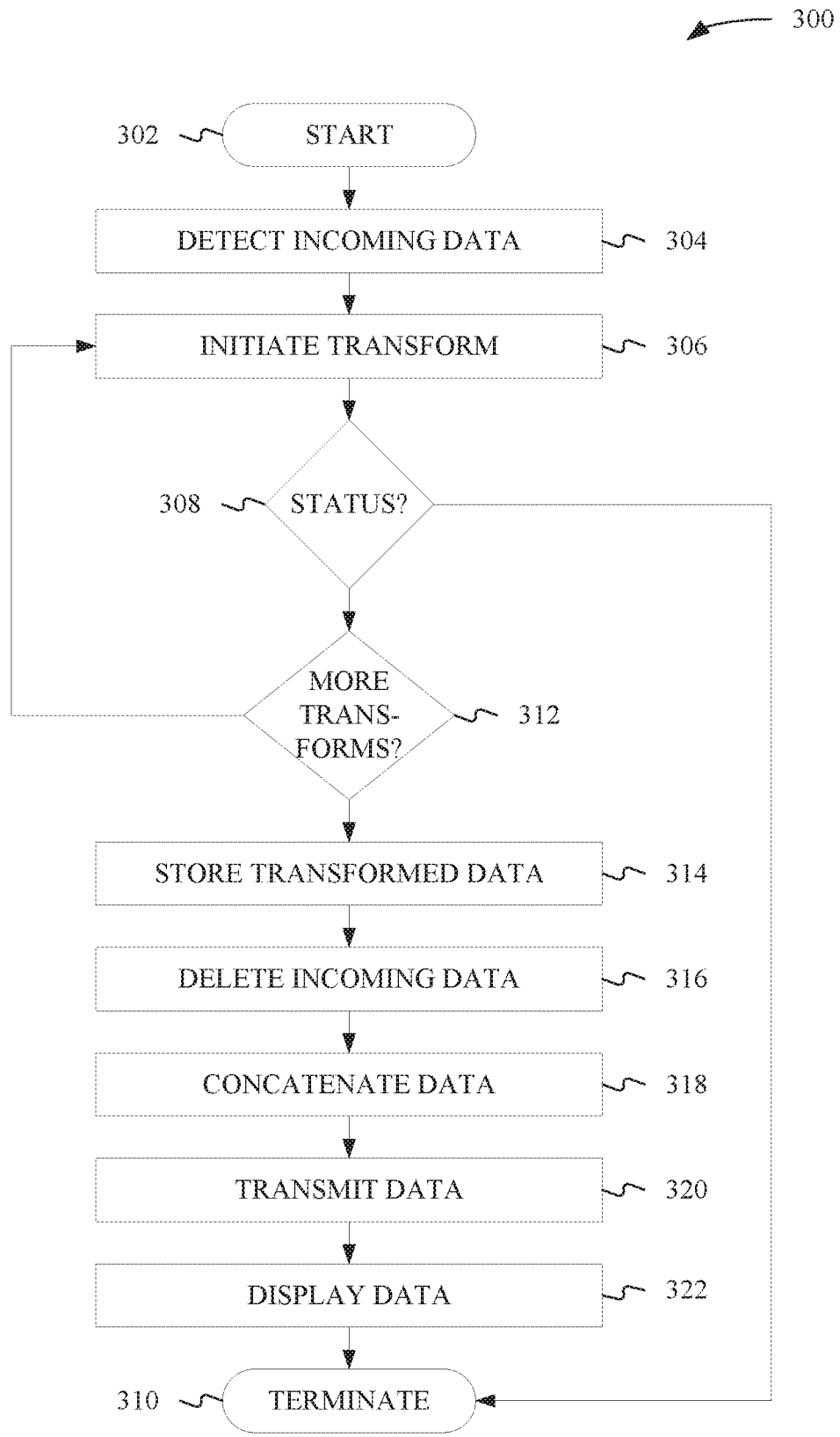
FIG. 3 shows an example method consistent with this disclosure.

FIG. 3 shows method 300 for managing an extensible data pipeline consistent with this disclosure. Method 300 can begin at starting block 302 and proceed to stage 304 where incoming data can be detected. For example, data can arrive at a queue, sometimes referred to as spigot. The data can be detected by backend system 104. For example, backend system 104 can monitor memory 204 for data that has not been transformed.

Upon the detection of incoming data, method 300 can proceed to stage 306 where a transform can be initiated. As disclosed herein, data can undergo a series of transforms. Each of the transforms can return transformed data and a status identifier. Initiating a transform can include using new data arriving at the spigot or using data from a previous transform.

After a transform is complete, a determination can be made based on the status (308). If the status identifier indicates anything other than a successful completion of the transform, then method 300 can terminate at termination block 310. If the status identifier indicates the transform was successful them a determination can be made as to whether or not there are more transforms in the pipeline to be completed (312). If there are more transforms to be completed, then method 300 can return to stage 306 where another transform can be initiated using data from a cache or other memory of backend system 104.

As disclosed herein, the backend system can be configured to run any number of pipelines. Each pipeline can be defined with one spigot and a fixed number of specific transforms. When the spigot emits data to the transforms, the transforms are run sequentially. The EDPM can take the data emitted by the spigot and provide it to the first transform function. After a transform completes the manager takes its result and provides it to the next transform. The EDPM continues to do this until a stop/fail is returned by a transform or until the last transform in the pipeline's definition has been called.

After the last of the series of transforms has been completed, the data can be stored as transformed data (314). The transformed data can also be stored before the last transform is completed. For example, the transformed data can be stored for later use by another transforms. For instance, data, or portions of data, can be transformed in different stages of the transform. As an example, a first subset of the data can be transformed in a first transform and a second subset of data can be transformed in a second transform. During a third transform, both the first and second subsets of data can be transformed simultaneously. As a result, after first and second transforms the first and second subsets of data can be saved in a cache and retrieved for use in the third transform.

To increase storage efficiency, the incoming data can be deleted (316). For example, once the series of transforms have been completed, the incoming data may no longer be needed. Because the series of transforms that occurred to the incoming data are known, the transforms can be reversed if needed to recreate the incoming data. As a result, storage efficiency is achieved because both the transformed and the incoming data do not have to be saved.

As disclosed herein, the transformed data can be concatenated with additional data (318). For example, POS data can be concatenated with manufacturer data and/or user reviews. The concatenated data can allow for user reviews and other manufacturer information to be displayed with POS data. For instance, the POS data can include pricing for products, which can be concatenated with images and user reviews. After concatenating the data, the data can be transmitted to displays or other systems (320). For example, the data can be transmitted to displays (322) for displaying or to other servers for additional processing. For instance, an image of a product concatenated with price data and user reviews can be transmitted to displays located in stores for viewing by customers. As such the displayed data can help customers make purchasing decisions.

One skilled in the art will understand in view of the present disclosure that the stages of method 300 can be rearranged and/or various stages can be omitted without departing from the scope of this disclosure. For example, the transformed data does not have to be concatenated with other data (318).

EXAMPLES AND NOTES

The following, non-limiting examples, detail certain aspects of the present subject matter to solve the challenges and provide the benefits discussed herein, among others.

Example 1 is a method for managing an extensible data pipeline, the method comprising: detecting, by a backend system, incoming data at a spigot; initiating, by the backend system, a sequence of transforms, each of the transforms operative to perform an operation on the data and output both transformed data and a status identifier, the status identifier indicating a status of a transform operation for a respective one of the transforms; and storing, by the backend system, the transformed data from a final transform along with a final identifier indicating a status of the final transform.

In Example 2, the subject matter of Example 1 optionally includes wherein initiating the sequence of transforms includes initiating a transform using the transformed data and the status identifier from a prior transform.

In Example 3, the subject matter of any one or more of Examples 1-2 optionally include wherein initiating the sequence of transforms includes: storing the transformed data from one of the sequence of transforms in a cache; and reading the transformed data from the cache for use in a subsequent transform.

In Example 4, the subject matter of any one or more of Examples 1-3 optionally include wherein initiating the sequence of transforms includes initiating a custom plugin, the custom plugin defining an external function.

In Example 5, the subject matter of any one or more of Examples 1-4 optionally include deleting the incoming data upon storing the transformed data.

In Example 6, the subject matter of any one or more of Examples 1-5 optionally include terminating the sequence of transforms when the status identifier of one of the sequence of transforms indicates an error, the final transform being a last transform to successfully complete.

In Example 7, the subject matter of any one or more of Examples 1-6 optionally include concatenating the transformed data with existing product data to create display data; transmitting the display data to a plurality of remote displays; and displaying the display data on each of the plurality of remote displays.

In Example 8, the subject matter of any one or more of Examples 1-7 optionally include wherein the status identifier includes an indication that the transform failed, succeeded, or stopped.

Example 9 is a backend system for managing an extensible data pipeline, the backend system comprising: a processor; and a memory storing instructions that, when executed by the processor, cause the processor to perform actions comprising: detecting incoming data at a spigot; initiating a sequence of transforms, each of the transforms operative to perform an operation on the data and output both transformed data and a status identifier, the status identifier indicating a status of a transform operation for a respective one of the transforms, and storing the transformed data from a final transform along with a final identifier indicating a status of the final transform.

In Example 10, the subject matter of Example 9 optionally includes wherein initiating the sequence of transforms includes initiating a transform using the transformed data and the status identifier from a prior transform.

In Example 11, the subject matter of any one or more of Examples 9-10 optionally include wherein initiating the sequence of transforms includes: storing the transformed data from one of the sequence of transforms in a cache; and reading the transformed data from the cache for use in a subsequent transform.

In Example 12, the subject matter of any one or more of Examples 9-11 optionally include wherein the actions further comprise initiating a custom plugin, the custom plugin defining an external function.

In Example 13, the subject matter of any one or more of Examples 9-12 optionally include wherein the actions further comprise terminating the sequence of transforms when the status identifier of one of the sequence of transforms indicates an error, the final transform being a last transform to successfully complete.

In Example 14, the subject matter of any one or more of Examples 9-13 optionally include wherein the status identifier includes an indication that the transform failed, succeeded, or stopped.

In Example 15, the subject matter of any one or more of Examples 9-14 optionally include wherein the actions further comprise: concatenating the transformed data with existing product data to create display data; transmitting the display data to a plurality of remote displays; and displaying the display data on each of the plurality of remote displays.

Example 16 is a system for displaying point of sale (POS) data, the system comprising: a plurality of displays; and a backend system for managing an extensible data pipeline, the backend system operable to perform actions comprising: detecting incoming data at a spigot, initiating a sequence of transforms, each of the transforms operative to perform an operation on the data and output both transformed data and a status identifier, the status identifier indicating a status of a transform operation for a respective one of the transforms, storing the transformed data from a final transform along with a final identifier indicating a status of the final transform, concatenating the transformed data with existing product data to create display data; and transmitting the display data to each of the plurality of displays, each of the plurality of displays located remotely from the backend system and operable to perform actions comprising: receiving the transformed data, and displaying the transformed data.

In Example 17, the subject matter of any one or more of Examples 15-16 optionally include wherein initiating the sequence of transforms includes initiating a transform using the transformed data and the status identifier from a prior transform.

In Example 18, the subject matter of any one or more of Examples 15-17 optionally include wherein the actions further comprise deleting the incoming data upon storing the transformed data.

In Example 19, the subject matter of any one or more of Examples 15-18 optionally include wherein initiating the sequence of transforms includes: storing the transformed data from one of the sequence of transforms in a cache; and reading the transformed data from the cache for use in a subsequent transform.

In Example 20, the subject matter of any one or more of Examples 15-19 optionally include wherein the actions further comprise terminating the sequence of transforms when the status identifier of one of the sequence of transforms indicates an error, the final transform being a last transform to successfully complete.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for managing an extensible data pipeline, the method comprising:
   detecting, by a processor of a server that includes a backend system, incoming data by a spigot, the incoming data comprising a first data having a first format and a second data having a second format, the first format being different than the second format, wherein the spigot detects the incoming data at a network inlet accessible to the backend system, wherein the spigot is a given function that continuously processes to detect the incoming data;
   initiating, by the processor, a sequence of transforms, each of the transforms performing an operation on the data and output both transformed data and a status identifier, each transform passes the corresponding transformed data and corresponding status identifier produced as output to a next transform via cache, the status identifier indicating a status of a transform operation for a respective one of the transforms, the transformed data having a common format, wherein each transform of the sequence is a function that processes the data and processes any previous output produced by a previous executed function that preceded the corresponding function in the sequence;
   storing, by the processor, the transformed data from a final transform along with a final identifier indicating a status of the final transform;
   causing, by the processor, the transformed data to be displayed on one or more displays; and
   iterating, by the processor, to the detecting for additional incoming data by the spigot to operate the extensible data pipeline as a customized pipeline for the incoming data and the additional incoming data.

2. The method of claim 1, wherein initiating the sequence of transforms includes initiating a transform using the transformed data and the status identifier from a prior transform.

3. The method of claim 1, wherein initiating the sequence of transforms includes initiating a custom plugin, the custom plugin defining an external function.

4. The method of claim 1, further comprising deleting the incoming data upon storing the transformed data.

5. The method of claim 1, further comprising terminating the sequence of transforms when the status identifier of one of the sequence of transforms indicates an error, the final transform being a last transform to successfully complete.

6. The method of claim 1, further comprising:
   concatenating the transformed data with existing product data to create display data;
   transmitting the display data to a plurality of remote displays; and
   displaying the display data on each of the plurality of remote displays.

7. The method of claim 1, wherein the status identifier includes an indication that the transform failed, succeeded, or stopped.

8. A backend system for managing an extensible data pipeline, the backend system comprising:
   a processor; and
   a memory storing instructions that, when executed by the processor, cause the processor to perform operations comprising:
      detecting incoming data by a spigot, the incoming data comprising a first data having a first format and a second data having a second format, the first format being different than the second format, wherein the spigot detects the incoming data at a network inlet accessible to the backend system, wherein the spigot is a given function that continuously processes to detect the incoming data,
      initiating a sequence of transforms, each of the transforms performing an operation on the data and output both transformed data and a status identifier, each transform passes the corresponding transformed data and corresponding status identifier produced as output to a next transform via cache, the status identifier indicating a status of a transform operation for a respective one of the transforms, the transformed data having a common format, wherein each transform of the sequence is a function that processes the data and processes any previous output produced by a previous executed function that preceded the corresponding function in the sequence, storing the transformed data from a final transform along with a final identifier indicating a status of the final transform;

causing the transformed data to be displayed on one or more displays; and iterating to the detecting for additional incoming data by the spigot to operate the extensible data pipeline as a customized pipeline for the incoming data and the additional incoming data.

9. The backend system of claim 8, wherein initiating the sequence of transforms includes initiating a transform using the transformed data and the status identifier from a prior transform.

10. The backend system of claim 8, wherein the operations further comprise initiating a custom plugin, the custom plugin defining an external function.

11. The backend system of claim 8, wherein the operations further comprise terminating the sequence of transforms when the status identifier of one of the sequence of transforms indicates an error, the final transform being a last transform to successfully complete.

12. The backend system of claim 8, wherein the status identifier includes an indication that the transform failed, succeeded, or stopped.

13. The backend system of claim 8, wherein the operations further comprise:

concatenating the transformed data with existing product data to create display data;

transmitting the display data to a plurality of remote displays; and displaying the display data on each of the plurality of remote displays.

14. The system of claim 13, wherein initiating the sequence of transforms includes initiating a transform using the transformed data and the status identifier from a prior transform.

15. The system of claim 13, wherein the operations further comprise deleting the incoming data upon storing the transformed data.

16. The system of claim 13, wherein the operations further comprise terminating the sequence of transforms when the status identifier of one of the sequence of transforms indicates an error, the final transform being a last transform to successfully complete.

17. A system for displaying point of sale (POS) data, the system comprising:

a plurality of displays; and a server that includes a backend system, the backend system comprising at least one computing device, and the computing device comprising a processor for managing an extensible data pipeline, the processor operable to perform operations comprising:

detecting incoming data by a spigot, the incoming data comprising a first data having a first format and a second data having a second format, the first format being different than the second format, wherein the spigot detects the incoming data at a network inlet accessible to the backend system, wherein the spigot is a given function that continuously processes to detect the incoming data, initiating a sequence of transforms, each of the transforms performing an operation on the data and output both transformed data and a status identifier, each transform passes the corresponding transformed data and corresponding status identifier produced as output to a next transform via cache, the status identifier indicating a status of a transform operation for a respective one of the transforms, the transformed data having a common format, wherein each transform of the sequence is a function that processes the data and processes any previous output produced by a previous executed function that preceded the corresponding function in the sequence, storing the transformed data from a final transform along with a final identifier indicating a status of the final transform, concatenating the transformed data with existing product data to create display data;

transmitting the display data to each of the plurality of displays, each of the plurality of displays located remotely from the backend system; and iterating to the detecting for additional incoming data by the spigot to operate the extensible data pipeline as a customized pipeline for the incoming data and the additional incoming data;

wherein each of the displays comprise a display processor and each display processor operable to perform second operations comprising:

receiving the transformed data, and displaying the transformed data on multiple remote displays.

* * * * *